(12) United States Patent
Van Voorhees et al.

(10) Patent No.: US 10,807,347 B2
(45) Date of Patent: Oct. 20, 2020

(54) LIGHT VALVE FILMS LAMINATED BETWEEN THIN GLASS AND PLASTIC SUBSTRATES

(71) Applicant: Research Frontiers Incorporated, Woodbury, NY (US)

(72) Inventors: Seth Van Voorhees, Short Hills, NJ (US); Dongyan Wang, Ithaca, NY (US); Steven M. Slovak, N. Massapequa, NY (US)

(73) Assignee: RESEARCH FRONTIERS INCORPORATED, Woodbury, NY (US)

( * ) Notice: Subject to any disclaimer, the term of this patent is extended or adjusted under 35 U.S.C. 154(b) by 0 days.

(21) Appl. No.: 15/499,508

(22) Filed: Apr. 27, 2017

(65) Prior Publication Data

US 2017/0322346 A1 Nov. 9, 2017

Related U.S. Application Data

(60) Provisional application No. 62/330,967, filed on May 3, 2016.

(51) Int. Cl.
  *B32B 17/10* (2006.01)
  *B32B 37/20* (2006.01)
  (Continued)

(52) U.S. Cl.
  CPC ...... *B32B 17/10495* (2013.01); *G02F 1/1334* (2013.01); *G02F 1/133305* (2013.01);
  (Continued)

(58) Field of Classification Search
  CPC combination set(s) only.
  See application file for complete search history.

(56) References Cited

U.S. PATENT DOCUMENTS

| 4,247,175 A | 1/1981 | Saxe |
| 4,407,565 A | 10/1983 | Saxe |

(Continued)

FOREIGN PATENT DOCUMENTS

| JP | H09-512580 A | 12/1997 |
| JP | 2003-297556 A | 10/2003 |

(Continued)

OTHER PUBLICATIONS

International Search Report and Written Opinion dated Sep. 12, 2017 in corresponding International Application No. PCT/US17/30035.

(Continued)

*Primary Examiner* — Edward J Glick
*Assistant Examiner* — Anthony G Quash
(74) *Attorney, Agent, or Firm* — Ostrolenk Faber LLP (57) ABSTRACT

A laminated light valve film comprising: (a) a film having first and second opposed outer surfaces; (b) a first layer of a polymeric interlayer material upon at least a portion of each opposed outer surface; (c) a first pair of substrates, one of which is adhered to the interlayer material upon the first outer opposed surface of the light valve film and the second is adhered to the interlayer material upon the second outer opposed surface of the light valve film, these substrates being formed from plastic or glass; (d) a second layer of polymeric interlayer material applied to at least a portion of an outer surface of each one of the first pair of substrates; and (e) a second pair of substrates, one being adhered to the interlayer upon the outer surface of one of the first pair of substrates and a second one adhered to the interlayer material on the outer surface of a second one of the first pair of substrates, the second pair of substrates being formed from plastic or glass, with the proviso that when the first pair of (Continued)

substrates is formed of plastic, the second pair of substrates is formed of glass, and vice-versa.

12 Claims, 2 Drawing Sheets

(51) Int. Cl.
    *B32B 37/22*     (2006.01)
    *G02F 1/1347*     (2006.01)
    *G02F 1/17*     (2019.01)
    *G02F 1/1334*     (2006.01)
    *G02F 1/1333*     (2006.01)

(52) U.S. Cl.
    CPC .......... *G02F 1/172* (2013.01); *B32B 2551/00* (2013.01); *G02F 2001/133302* (2013.01)

(56) References Cited

U.S. PATENT DOCUMENTS

| | | | |
|---|---|---|---|
| 4,772,103 A | 9/1988 | Saxe | |
| 5,408,353 A * | 4/1995 | Nichols | B32B 17/10036 359/260 |
| 5,409,734 A | 4/1995 | Lee et al. | |
| 5,461,506 A | 10/1995 | Check, III et al. | |
| 5,463,491 A | 10/1995 | Check, III | |
| 5,463,492 A | 10/1995 | Check, III | |
| 6,301,040 B1 | 10/2001 | Chakrapani et al. | |
| 6,416,827 B1 | 7/2002 | Chakrapani et al. | |
| 6,486,928 B1 | 11/2002 | Lin et al. | |
| 6,815,070 B1 * | 11/2004 | Burkle | B32B 3/04 427/165 |
| 6,900,923 B2 | 5/2005 | Chakrapani et al. | |
| 6,936,193 B2 | 8/2005 | Saxe et al. | |
| 7,361,252 B2 | 4/2008 | Slovak et al. | |
| 8,670,173 B2 * | 3/2014 | Wang | B32B 17/10036 359/296 |
| 9,193,135 B2 * | 11/2015 | Boote | B32B 17/10 |
| 2005/0140917 A1 | 6/2005 | Miura et al. | |
| 2005/0227061 A1 * | 10/2005 | Slovak | B32B 17/10 428/323 |
| 2008/0032124 A1 | 2/2008 | Becker et al. | |
| 2011/0170170 A1 * | 7/2011 | Boote | B32B 17/10174 359/296 |
| 2012/0013969 A1 * | 1/2012 | Wang | B32B 17/10036 359/296 |
| 2012/0236393 A1 * | 9/2012 | Slovak | G02F 1/172 359/296 |
| 2014/0300830 A1 * | 10/2014 | Wang | G02F 1/1339 349/5 |
| 2014/0349093 A1 * | 11/2014 | Hasskerl | B32B 17/10018 428/213 |
| 2016/0075111 A1 * | 3/2016 | Dixon | B32B 17/10036 428/172 |
| 2016/0282645 A1 | 9/2016 | Wang et al. | |

FOREIGN PATENT DOCUMENTS

| | | |
|---|---|---|
| JP | 2005-250119 A | 9/2005 |
| JP | 2013-254079 A | 12/2013 |
| JP | 2014-091405 A | 5/2014 |
| KR | 10-2007-0064597 A | 6/2007 |
| WO | WO 95/29968 A1 | 11/1995 |
| WO | WO 2014/174310 A1 | 10/2014 |

OTHER PUBLICATIONS

G. R. Nowling, et. al., "Chamberless Plasma Deposition of Glass Coatings on Plastics," Plasma Sources Science and Technology, 14, (2005), pp. 477-484.

International Preliminary Report on Patentability dated Nov. 15, 2018 containing the Written Opinion of the International Searching Authority in corresponding International Application No. PCT/US2017/030035.

Notice of Office Action dated Aug. 27, 2019 in corresponding Korean Patent Application No. 10-2018-7033784 with English translation.

Office Action dated Sep. 30, 2019 in corresponding Japanese Patent Application No. 2018-557308 with English translation.

Extended European Search Report dated Dec. 3, 2019 in corresponding European Patent Application No. EP 17 79 3035.

\* cited by examiner

LIGHT VALVE FILMS LAMINATED BETWEEN THIN GLASS AND PLASTIC SUBSTRATES

CROSS-REFERENCE TO RELATED APPLICATION

The present patent application is a nonprovisional and claims the benefit of and priority to U.S. Provisional Patent Application No. 62/330,967, filed on May 3, 2016, by Seth Van Voorhees, Dongyan Wang and Steven M. Slovak, and entitled "SUSPENDED PARTICLE DEVICE FILMS LAMINATED BETWEEN THIN GLASS AND PLASTIC SUBSTRATES," the entire content of which is hereby incorporated by reference herein.

FIELD OF THE INVENTION

The invention is directed to films and laminations of films for use in light valves which comprise liquid particle suspensions. Suspended Particle Devices are generally referred to herein as SPD light valves, or simply as SPDs. Polymer dispersed liquid crystal light valve films are generally referred to as PDLCs. The films are laminated between a combination of thin glass and plastic substrates.

GENERAL BACKGROUND

Light valves have been known for more than eighty years for use in the modulation of light. They have been proposed for use in numerous applications during that time including, e.g., alphanumeric displays and television displays; filters for lamps, cameras, displays and optical fibers; and windows, sunroofs, toys, sunvisors, eyeglasses, goggles, mirrors, rearview mirrors, light pipes and the like to control the amount of light passing therethrough or reflected therefrom as the case may be. Examples of windows include, without limitation, architectural windows for commercial buildings, greenhouses and residences; windows, visors and sunroofs for automotive vehicles, boats, trains, planes and spacecraft; windows for doors including peepholes, and windows for appliances such as ovens and refrigerators, including compartments thereof.

As used herein, the term "light valve" refers to a cell formed of two walls that are spaced apart by a small distance, with at least one wall being transparent. The walls have electrodes thereon, usually in the form of transparent, electrically conductive coatings. Optionally, the electrically conductive coatings can be deposited on the walls in patterns so that different segments of the light valve can be selectively activated. Additionally the electrodes on the walls may have thin transparent dielectric overcoatings thereon. The cell contains a light-modulating element (sometimes herein referred to as an activatable material) which may, without limitation, be either a liquid suspension of particles, or alternately, all or a portion of the entire element may comprise a plastic film in which droplets of a liquid suspension of particles are distributed.

For SPDs, the liquid suspension (sometimes herein referred to as a liquid light valve suspension or simply as a light valve suspension) comprises small particles suspended in a liquid suspending medium. In the absence of an applied electrical field, the particles in the liquid suspension of a SPD light valve may assume random positions due to Brownian movement. Hence, a beam of light passing into the cell is reflected, transmitted or absorbed depending upon the cell structure, the nature and concentration of the particles and the energy content of the light. The light valve using this type of particle movement is thus relatively dark in the OFF state. However, when an electric field is applied through the liquid light valve suspension in the light valve, the particles become aligned and for many suspensions most of the light can pass through the cell. The light valve is thus relatively transparent in the ON state. Alternatively, the particles in the liquid suspending medium can achieve the ON and OFF states through other types of electrophoretic particle movement. The AT is defined as the difference in visible light transmission between the ON and OFF states.

For many applications it is preferable for all or part of the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of a light valve suspension, can be avoided through use of a film and the risk of possible leakage can also be avoided. Another advantage of using a plastic film is that, in a plastic film the particles are generally present only within very small droplets and, hence, do not noticeably agglomerate when the film is repeatedly activated with a voltage.

The term SPD light valve film as used herein means a film or sheet, or more than one thereof, comprising a suspension of particles used or intended for use in a light valve. Such a light valve film usually comprises a discontinuous droplet phase of a liquid or liquids comprising dispersed particles (liquid light valve suspension), such discontinuous phase being dispersed throughout a solid continuous matrix phase, said phases enclosed within one or more rigid or flexible solid films or sheets. The combined aforesaid phases are referred to as the cured SPD emulsion, which forms part of a light valve film, sometimes also referred to as a film or film layer. The SPD light valve film and/or laminate of the light valve film may also comprise one or more additional layers such as, without limitation, a film, coating, sheet or combination thereof, which may provide the light valve film with one or more of, for example, (1) scratch resistance, (2) protection from ultraviolet radiation, (3) reflection of infrared energy, (4) electrical conductivity for transmitting an applied electric or magnetic field to the activatable material, (5) dielectric overcoatings, (6) color tinting, (7) photovoltaic and (8) acoustic control. The additional layers may be adhered to said light valve film with a pressure sensitive adhesive (PSA) interlayer known to those skilled in the art or with additional plies of interlayer during the lamination procedure as discussed below in the Summary of the Invention.

A common (but non-limiting) construction for an SPD film has five layers, namely, from one side to the other: (1) a first sheet of polyethylene terephthalate ("PET") plastic, conveniently 5-7 mils in thickness, (2) a very thin transparent, electrically conductive coating of indium tin oxide ("ITO") or alternative conducting coating, acting or capable of acting as an electrode, on an inner surface of said first sheet of PET, (3) a layer of cured (i.e., cross-linked) SPD emulsion, usually 2-5 mils in thickness and, (4) a second ITO coating acting or capable of acting as an electrode on an inner surface of (5) a second PET plastic substrate. As stated previously, additional layers which provide other functions may optionally be added to the exemplary SPD film described above. Typically, a material such as copper foil, conductive fabric or the like is affixed to the electrodes such that the material extends beyond the perimeter of the SPD film for convenient connection of the film to a suitable voltage source. Furthermore the SPD film can be laminated, for example, with transparent hot melt adhesive films and/or glass or thicker transparent plastic sheets to provide strength and rigidity and to protect various parts of the combined unit from environmental stresses which may, otherwise, damage its performance characteristics. See, for example, U.S. Pat. No. 7,361,252 which is assigned to the assignee of the present invention.

U.S. Pat. No. 5,409,734 exemplifies a type of non-cross-linked light valve film that is made by phase separation from a homogeneous solution. Light valve films made by cross-linking (curing) of emulsions are also known. The films of the present invention are specifically directed to the use of the latter type of film, i.e., film comprising a layer formed by cross-linking an emulsion, and to laminated films produced thereby. See, for example, U.S. Pat. Nos. 5,463,491 and 5,463,492, and 7,361,252 all of which are assigned to the assignee of the present invention. Various types of SPD emulsions, and methods of curing the same, are described in U.S. Pat. Nos. 6,301,040, 6,416,827, and 6,900,923 B2, all of which are assigned to the assignee of the present invention. Such films and variations thereof may be cured through cross-linking brought about by exposing the films to (1) ultraviolet radiation, (2) electron beams or (3) heat. A non-limiting example of such a film from Example 5 of U.S. Pat. No. 6,900,923 B2 is produced as follows: 0.002 g of Irgacure 819 (Ciba Specialty Chemicals) photoinitiator ("PI") was dissolved in 2 mL of chloroform and added to 1 g of the matrix polymer described in Example 1. The PI solution was thoroughly mixed with the matrix polymer and the chloroform solvent was removed by placing the mixture inside of a vacuum oven for 30 minutes at 60° C. To this was added 0.62 g of polyiodide crystal paste containing the lauryl methacrylate/HEMA suspending polymer (0.56 g, as synthesized in example 3 of the patent). The resulting mixture was thoroughly mixed and the emulsion obtained was applied onto a conductive coated polyester substrate as a 2 mil thick coating using a doctor blade, mated with a blank conductive coated polyester substrate and cured with ultraviolet radiation (8600 mJ/cm$^2$/min) for 2 min and 30 seconds. All of the patents and patent applications and other references cited in this application are incorporated herein by reference.

A variety of liquid light valve suspensions are well-known in the art and such suspensions are readily formulated according to techniques well-known to one of ordinary skill therein. The term liquid light valve suspension, as noted above, when used herein means a liquid suspending medium in which a plurality of small particles are dispersed. The liquid suspending medium comprises one or more non-aqueous, electrically resistive liquids in which there is preferably dissolved at least one type of polymeric stabilizer which acts to reduce the tendency of the particles to agglomerate and to keep them dispersed and in suspension.

Liquid light valve suspensions useful in the present invention may include any of the so-called prior art liquid suspending media previously proposed for use in light valves for suspending the particles. Liquid suspending media known in the art which are useful herein include, but are not limited to, the liquid suspending media disclosed in U.S. Pat. Nos. 4,247,175, 4,407,565, 4,772,103, 5,409,734, 5,461,506, 5,463,492, and 6,936,193 B2, the disclosures of which are incorporated herein by reference. In general one or both of the suspending medium and/or the polymeric stabilizer typically dissolved therein is chosen so as to maintain the suspended particles in gravitational equilibrium.

The polymeric stabilizer, when employed, can be a single type of solid polymer that bonds to the surface of the particles, but which also dissolves in the non-aqueous liquid(s) which comprise the liquid suspending medium. Alternatively, there may be two or more solid polymeric stabilizers serving as a polymeric stabilizer system. For example, the particles can be coated with a first type of solid polymeric stabilizer such as nitrocellulose which, in effect, when dissolved provides a plain surface coating for the particles, together with one or more additional types of solid polymeric stabilizer that when dissolved, bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described for example in U.S. Pat. No. 5,463,492.

Inorganic and organic particles may be used in a light valve suspension, and such particles may be either light absorbing or light reflecting in the visible portion of the electromagnetic spectrum.

Conventional SPD light valves have generally employed particles of colloidal size. As used herein the term colloidal means that the particles generally have a largest dimension averaging 1 micron or less. Preferably, most polyhalide or non-polyhalide types of particles used or intended for use in an SPD light valve suspension will have a largest dimension which averages 0.3 micron or less and more preferably averages less than one-half of the wavelength of blue light, i.e., less than 2000 Angstroms, to keep light scatter extremely low.

Another example of a light valve film is a PDLC film. Similar to SPD films, PDLC films comprising liquid crystals are dispersed into a liquid polymer, followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of a "smart window" comprising such a film. Typically, the liquid mix of polymer and liquid crystals is placed between two glass or plastic substrates that include, on their inner aspect, a thin layer of a transparent, conductive material, followed by curing of the polymer, thereby forming the basic sandwich structure of the smart window. This structure is in effect a capacitor.

In such case, electrodes from a power supply are attached to the transparent electrodes. With no applied voltage, the liquid crystals are randomly arranged in the droplets, resulting in scattering of light as it passes through the smart window assembly. This results in the translucent, "milky white" appearance. When a voltage is applied to the electrodes, the electric field formed between the two transparent electrodes on the glass causes the liquid crystals to align, allowing light to pass through the droplets with very little scattering and resulting in a transparent state.

BACKGROUND OF THE INVENTION

In some cases, as mentioned above an SPD laminate or PDLC laminate is desired wherein the film is sandwiched, using transparent hot melt adhesive films (interlayers), between transparent glass or plastic sheets. There are applications such as, but not limited to, aircraft, architectural and automobile windows where a light weight laminate that also prevents moisture from entering the interior of the laminate via the face of the substrates used to form the laminate is desired. Therefore, it is the aim of the present invention to construct a laminate that comprises both thin, light weight glass substrates and plastic substrates on both opposing sides of the film.

Deficiencies of Prior Art SPD Films

SPD films, particularly those that comprise polyiodide particles, are susceptible to moisture in that if moisture contacts the cured SPD emulsion, it can lead to degradation of the SPD film, including discoloration of the SPD film and a reduction in its optical performance such as loss of AT. The moisture can enter the SPD laminate through the edge of the laminate. Thus materials and methods have been developed for sealing the edge of the SPD laminate to prevent the penetration of moisture therethrough, as described for example in U.S. Pat. No. 8,670,173 and U.S. Patent Publication No. US 2016/0282645 A1.

Compared to glass, plastics such as acrylics and polycarbonates are more susceptible to moisture penetration. Therefore, SPD laminates comprised solely of plastic substrates may allow moisture penetration through the opposing faces of the SPD laminate. However, SPD laminates made with plastic substrates have the benefit of light weight, improved UV protection and impact resistance compared to an SPD laminate made with glass substrates.

SUMMARY OF THE INVENTION

In one embodiment, light valve laminates comprise both thin, light weight glass and plastic substrates. These were prepared and tested in a high temperature, high humidity environment to show that the thin glass prevented moisture from entering the laminate through the face of the laminate. The location of the glass substrates, as well as the plastic substrates, as the outer or inner set of substrates comprising the light valve laminate, is determined by the specific intended application as would be well understood by one of ordinary skill in this field. Examples of glass useful for this invention include, but are not limited to, tempered glass, annealed glass, low iron glass, low e glass, UV blocking glass and chemically strengthened glasses such as Gorilla® glass produced by Corning Corporation and Willow® glass, also produced by Corning. The thicknesses of the glass substrates should have a range of 0.55 mm to 2.0 mm, preferably 0.55 mm to 1.10 mm.

In addition, the use of antimicrobial glass as the outer substrate of the laminate in combination with one or more plastic substrates, will impart beneficial health safety properties to the resulting light valve. Antimicrobial agents destroy or inhibit the growth of microorganisms, especially pathogenic microorganisms. Antimicrobial glass is formulated with an ionic silver component as the antimicrobial agent on the surface of the glass. Such health safety properties are useful in a number of applications such as in medical facilities and museum displays to reduce the transfer of harmful bacteria by contact with the light valve. The plastic substrates provided strength and rigidity, as well as UV protection to the light valve laminate.

As used in this application plastics useful for this invention include, but are not limited to, polycarbonate, polymethyl methacrylate (acrylic), polystyrene and polypropylene. The thicknesses of the plastic substrates should have a range of 1.0 mm to 10.0 mm, preferably 1.0 mm to 5.0 mm.

In cases where a flexible SPD laminate is required, the glass and plastic substrates used for the lamination should each have a thickness of 0.10 to 0.55 mm, preferably 0.10 mm to 0.20 mm which allow for bending of the final light valve laminate for curved applications without damage to the light valve laminate.

Sheets of a polymeric interlayer material are placed between: (1) the film and the innermost substrate laminated thereto, i.e., whether it be formed of glass or plastic, coated glass or coated plastic (see below); as well as (2) between the innermost and outermost substrates laminated to the film. The purpose of this interlayer material is to hold the various laminate components together during and following the formation of the laminate. In the case of plastic substrates, the plastic substrates are comprised of materials that have softening points significantly higher, i.e. at least 10° C., than those of the polymeric interlayers that are heated and cooled during the lamination process to form the laminate. This prevents the plastic sheets from softening and deforming during the lamination process. For example, an acrylic, polymethyl methacrylate substrate (Tg or softening point of 105° C.) might be used in a lamination with ethylene vinylacetate (EVA) interlayers because the EVA melts at 80° C. However, the acrylic substrate could not be used as the substrate if the interlayer was polyvinyl butyral (PVB) because the PVB melts at 120° C. On the other hand, a polycarbonate substrate (Tg or softening point of 157° C.) could be safely used with either EVA or PVB. Another material that may be used in forming the polymeric interlayer in the present invention is polyurethane.

Another embodiment involves the use of plastic substrates incorporating plastics of the types and dimensions described above that have been coated on one or both sides with at least one thin layer of glass, each said glass layer having a thickness of 0.5 microns-2.4 microns, preferably 0.5 microns-1.5 microns, for forming the substrates comprising a light valve laminate. The literature reports that glass can be coated on plastic substrates. For example, "Chamberless plasma deposition of glass coatings on plastics" (G R Nowling, M Yajima, et. al., Plasma Sources Sci. Technol., 14, (2005), 477-484) reports that "high-quality glass has been deposited on plastic . . . ", " . . . an atmospheric plasma process that operates without a chamber so that there is no limitation on the substrate size or dimensions." and "Coating plastics with thin films of glass by a "poor man's" ALD method" states that "at ambient pressure, no vacuum systems are required . . . " and "it can be run at low temperatures, at room temperature and certainly below 100° C." (See the website address: otd.harvard.edu/explore-innovation/technologies/coating-plastics-with-thin-films-of-glass-by-a-poor-mans-ald-method/). The plastic substrates for this embodiment would have the same 1.0 mm to 10.0 mm, preferably 1.0 mm to 5.0 mm. range of thickness as discussed above.

In still another embodiment, glass substrates of the types described above that have been coated on one or both sides with at least one layer of plastic, each said coating layer having a thickness of 1 micron-25 microns, preferably, 10 microns-25 microns, can be used as the substrates for forming the light valve laminate. The thickness of the plastic coating on either side of the glass substrate is usually, but not necessarily equal. As disclosed above, the plastic(s) used to coat the glass substrates are comprised of materials that have melting points significantly higher (i.e., at least 10° C.) than those of the polymeric interlayers that are heated and cooled during the lamination process to form the laminate.

DETAILED DESCRIPTION OF THE INVENTION

Figure 1:
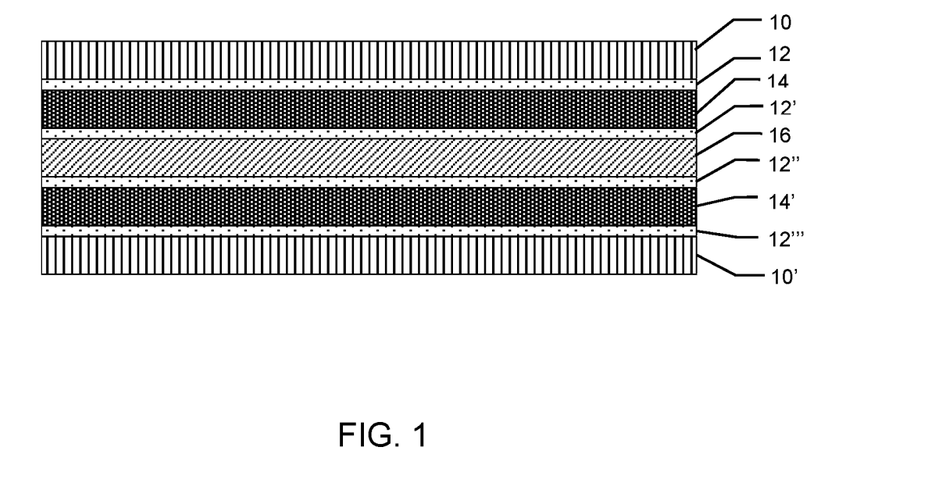
FIG. 1 provided herewith is a cross-sectional view through a first embodiment of the laminated light valve film according to the invention.

As indicated above, FIG. 1 is a cross-sectional view through a first embodiment of the invention. Proceeding from the top of the figure toward the bottom, the various layers of the laminate are described as follows. Layer 10 is a first plastic substrate. Layer 12 is a first adhesive interlayer. Layer 14 is a first glass substrate. Layer 12' is a second adhesive interlayer. The item designated as 16 is a suspended particle device (SPD) light valve. Next, 12" is a third adhesive interlayer. Layer 14' is a second glass substrate. Layer 12'" is a fourth adhesive interlayer. Finally, layer 10' is a second plastic substrate.

Figure 2:
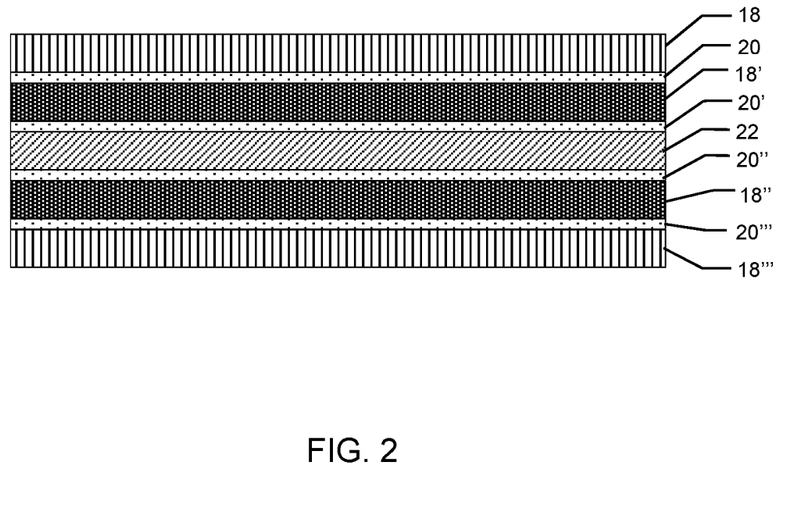
FIG. 2 provided herewith is a cross-sectional view through a further embodiment of the laminated light valve film according to the invention.

FIG. 2 illustrates an alternate embodiment of the claimed laminate. Again, beginning from the top of the figure, layer 18 is a first glass or plastic substrate, having a thickness of from 0.1 mm to 0.55 mm. Layer 20 is a first adhesive interlayer. Layer 18' is a second glass or plastic substrate, having a thickness of from 0.1 mm to 0.55 mm. Layer 20' is a second adhesive interlayer. Layer 22 is a suspended particle device (SPD) light valve. Layer 20" is a third adhesive interlayer. Layer 18" is a third glass or plastic substrate, having a thickness of from 0.1 mm to 0.55 mm. Layer 20' is a fourth adhesive interlayer. Finally, layer 18' is a fourth glass or plastic substrate, again having a thickness of from 0.1 mm to 0.55 mm.

Glass sheets with thicknesses of 0.55 mm and 1.10 mm were obtained from Corning Glass, Corning, N.Y., under the trade name of Gorilla® Glass. Furthermore, acrylic plastic sheets, 3.175 mm thick, sold under the trade name Acrylite® OP-2, were obtained from Evonik Performance Materials, Parsippany, N.J. Impact-resistant clear polycarbonate plastic sheets, 1.5875 mm thick, were obtained from McMaster-Carr, Dayton, N.J. Glass NMR tubes with a thickness of 0.24 mm were obtained from Wilmad Glass, Vineland, N.J. Standard glass sheets with a thickness of 2.38 mm were used for the control laminations.

Initial heat/high humidity tests were performed on the NMR glass tubes, standard 2.38 mm thick glass laminates and laminates prepared with the glass and plastic substrates described above to determine the ability of these samples to prevent moisture penetration. The laminates so prepared incorporated a moisture-sensitive indicator strip into the lamination stack that was positioned adjacent to the SPD film within the laminate. The indicator strips were also sealed inside of the NMR tubes. The strips used for these laminations were Humidity Detection strips, 20%-80%, Part#33813-2080 obtained from Indigo Instruments, www.indigo.com.

Standard SPD light valve laminates were prepared as described in the aforementioned U.S. Pat. No. 7,361,252 patent. A non-limiting summary of the procedure for laminating SPD films is found in U.S. Pat. No. 7,361,252, assigned to the assignee of the present invention, involves creating a "stack" comprising in sequence a first glass sheet, a first sheet of interlayer, the SPD film comprising cured SPD emulsion sandwiched between two ITO-coated PET substrate sheets with copper foil bus bars attached to and protruding from the ITO coatings, a second sheet of interlayer and a second glass sheet, all positioned substantially congruent to one another. The stack was placed in a vacuum bag within a Carver Press and a strong vacuum was applied (greater than 29 inches of mercury). The platens of the press were then arranged to touch the outsides of the unlaminated stack and their temperature elevated to affect melting of the interlayers within the stack. The platens were then cooled to solidify the interlayers which adheres the stack into an SPD laminate.

In addition, laminates formed with glass and plastic substrates were also prepared. A non-limiting example of the layup for one of these laminates would be thin glass/interlayer/plastic/interlayer/SPD film/interlayer/plastic/interlayer/thin glass. As used herein a "thin" glass sheet means a glass sheet with a thickness of <1.10 mm.

In order to prevent moisture from entering through the edge of the sample laminates, frames of polyisobutylene (PM) were incorporated into the laminate, as described in US Publication No. US 2016/0282645 A1. The frames of the polyisobutylene moisture-resistant material were incorporated into the stack beginning at the outer edge of the glass to a position adjacent to the SPD film within the laminate. Taking into account, then, the presence of the PM frames, any moisture penetration into the laminate would thus be attributable to moisture entering the laminate through the face of the laminate, not through the edge of the laminate. Two frames are used so that the copper foil protruding outside the laminate is surrounded on both sides by the PIB material.

The initial ΔT or visible transmittance range (ON state transmittance-OFF state transmittance) of each SPD light valve laminate was measured with The Color Sphere Visible Spectrophotometer, manufactured by Byk-Gardner, by applying an electric field of 100V/60 Hz to the protruding busbars of the laminate to obtain the ON-state transmittance. These optical measurements were repeated periodically during the humidity test.

The procedure used to test the samples in a high temperature/humidity environment, as disclosed in US Publication No. US 2016/0282645 A1, assigned to the assignee of the present invention, is as follows: SPD laminates, laminates without SPD film and other samples with different configurations were placed in an upper portion of a desiccator that had a reservoir of water in the lower section thereof. A ceramic plate with holes prevented the samples from coming in direct contact with the water in the bottom section of the desiccator. Placing this desiccator in a 60° C. oven creates a high temperature, high humidity environment that SPD films and SPD laminates would not normally be exposed to in the field. However, these extreme conditions were created so that meaningful test results would be obtained in a reasonable period of time. The moisture-saturated desiccator containing the samples was placed in a 60° C. oven and the samples were periodically evaluated for one or more of 1) the presence of moisture within the laminate as detected by the moisture indicator strips, 2) the change in the appearance of the clear interlayer within the laminate from clear to cloudy/hazy and 3) the ΔT change of the SPD film within the laminate. A positive (+) ΔT change indicates that the range of light transmission for the SPD film has increased during exposure to the 60° C. temperature during the test. This is due to the improved dispersion of the polyiodide particles within the SPD film and should not be viewed as a loss in functionality.

RESULTS AND DISCUSSION

TABLE 1

Results of 60° C. High Humidity Test (glass, glass/plastic laminates)

| Laminate Details | Days of 60° C., High Humidity Exposure | Moisture Indicated From Strip | Clear Interlayer Became Hazy |
|---|---|---|---|
| NMR tube 0.24 mm, flame sealed, indicator only | 435 | No | — |
| Gorilla ® Glass 0.55 lam, indicator only | 247 | Yes | Yes |
| Gorilla ® Glass 1.10 lam, indicator only | 247 | Yes | Yes |
| Standard glass/Standard glass lam, indicator only (Leads) | 260 | Yes | Yes |
| Gorilla ® Glass 0.55-Standard Glass lam, indicators only (thin-thick) | 284 | Yes | Yes |
| Acrylite ®/Acrylite ® lam, indicator only | 6 | Yes | Yes |
| Polycarbonate/Polycarbonate lam, indicator only | 2 | Yes | Yes |
| Gorilla ® Glass 0.55/Acrylite ®/Acrylite ®/Gorilla ® Glass 0.55 lam, indicator only | 163 | Yes | Yes |
| Gorilla ® Glass 0.55/Acrylite ®/Acrylite ®/Gorilla ® Glass 0.55 lam, indicator only (Leads) | 181 | Yes | Yes |

All laminations (lam) are PM frame protected
"Gorilla® Glass 0.55-Regular Glass lam" is also marked as "thin-thick glass lam".
"Gorilla® Glass 0.55" is Gorilla® Glass of 0.55 mm thickness.
"Gorilla® Glass 1.10" is Gorilla® Glass of 1.10 mm thickness.
"Standard glass" is 2.38 mm thickness
"Acrylite®" is acrylic plastic of 3.175 mm thickness
"Polycarbonate" plastic is 1.5875 mm thick Table 1 provides the 60° C. high humidity test results for non-SPD film containing laminates and other samples. The tests with the NMR glass tubes show that glass thicknesses as low as 0.24 mm are still very effective as moisture barriers. For example, the flame sealed 0.24 mm thick NMR glass tube has been in the 60° C. high humidity chamber for 435 days with no color change observed for the moisture strip and the test continues.

Two laminates made with Gorilla® Glass substrates, 0.55 mm thick and 1.10 mm thick, were exposed in the 60° C. high humidity chamber for 247 days before a color change was observed and the moisture strip and the clear interlayer in these laminates became hazy. The laminate in Table 1 labeled, "(thin-thick)" is comprised of 0.55 mm thin glass and 2.38 mm standard glass and a separate moisture indicator strip was placed adjacent to each of the glass substrates. If moisture passes through the thin glass substrate first, the moisture strip adjacent to the thin glass will change color before the moisture strip adjacent to the thick glass substrate changes color. This laminate was exposed in the 60° C. high humidity chamber for 284 days before a color change was observed for both moisture strips. Conversely, the indicator strip within the laminates made with acrylic substrates)(Acrylite®/Acrylite®) and polycarbonate substrates (polycarbonate/polycarbonate) turned color after 6 days and 2 days of exposure in the 60° C. high humidity chamber respectively. The clear interlayer in both of these laminates turned hazy. This demonstrates that plastic substrates of varying thicknesses allow moisture penetration after a short time.

Finally, the acrylic and glass hybrid laminates made with the following configuration: Gorilla® Glass 0.55/Acrylite®/Acrylite®/Gorilla® Glass 0.55, were exposed in the 60° C. high humidity chamber for 163 days and 181 days respectively before color change was observed for the moisture strip and the clear interlayer in these laminates became hazy. One of the hybrid laminates described above also had copper foil busbars protruding from the laminate to simulate the presence of an SPD film inside the laminate. As mentioned above, this laminate had been in the 60° C. high humidity chamber for 181 days before a color change was observed for the moisture strip. A double frame of PM was used on this laminate to prevent moisture from entering the edge of the laminate where the copper foil exits the laminate. The data clearly shows that the 60° C. temperature and high humidity environment of this test allowed moisture to pass through the face of the plastic substrate laminates after only several days of exposure. The fact that the thinnest all-glass 0.24 mm NMR tube sample tested lasted over 435 days without allowing moisture penetration confirms that glass is ideal for moisture prevention. Although the laminates made with glass alone or glass and plastic eventually showed the presence of moisture within the laminates, the fact that a minimum of 161 days was required for detection by the moisture strips strongly suggests that the moisture entered the laminates through the edges of the laminates. Although, as described above, PIB frames were incorporated into the laminates to prevent moisture ingress via the edge of the laminates, the severity of the test conditions likely allowed the moisture to eventually pass between the substrates and through the edge of the laminates. The same explanation also applies to the applicable results below for Table 2.

TABLE 2

Results of 60° C. High Humidity Test (SPD: glass, glass/plastic laminates)

| Laminate Details | Moisture Indicated from Strip | Cloudy Interlayer Appearance | ΔT change-days and status |
|---|---|---|---|
| Std. Glass/SPD/Std. Glass, lam | No | No | +5.60, 306 days |
|  | Yes | Yes | −14.02, 392 days |
| Acrylite ®/SPD/Acrylite ® lam | 6 days | Yes | −6.50, 27 days |
|  | Yes | Yes | Malfunction, discontinued at 83 days |
| Gorilla ® Glass 0.55/Acrylite/SPD/Acrylite ®/Gorilla ® Glass 0.55 lam | No | No | +4.18, 141 days |
|  | Yes | Yes | +5.30, 212 days |
|  | Yes | Yes | Malfunction, discontinued at 227 days, |
| Acrylite ®/Gorilla ® Glass 0.55/SPD/Gorilla ® Glass 0.55/Acrylite ® lam, (reverse) | No | Yes | −2.82, 55 days |
|  | No | Yes | −8.70, 306 days |
|  | Yes | Yes | Malfunction, discontinued at 392 days |

All laminations (lam) were double PM frame protected and had copper leads protruding from the edge "Gorilla® Glass 0.55" is Gorilla® Glass of 0.55 mm thickness.
"Gorilla® Glass 1.10" is Gorilla® Glass of 1.10 mm thickness.
"Std. Glass" is a standard glass of 2.38 mm thickness
"Acrylite®" is acrylic plastic of 3.175 mm thickness Table 2 provides the 60° C. high humidity test results for SPD film-containing laminates. The results are similar to those obtained for the non-SPD-containing laminates in Table 1. For example, the SPD laminate made with glass substrates (Glass/SPD/Glass) exposed in the 60° C. high humidity chamber for 306 days had no color change observed for the moisture strip, the clear interlayer in these laminates had not become hazy and the SPD film within the laminates has gained 5.60 transmittance points. After 392 days of exposure, a color change was observed for the moisture strip, the clear interlayer in the laminate became hazy and the SPD film within the laminate lost 14.02 transmittance points. As described for the Table 1 results above, moisture entering through the edge of the laminate was responsible for the 392 day exposure results.

The glass and acrylic hybrid laminate made with the following configuration: Gorilla® Glass 0.55/Acrylite®/SPD/Acrylite®/Gorilla® Glass 0.55, had been in the 60° C. high humidity chamber for 141 days with no color change observed for the moisture strip, the clear interlayer in the laminate did not become hazy and the SPD film within the laminate gained 4.18 transmittance points. After 212 days of exposure color change was observed for the moisture strip, the clear interlayer in the laminate became hazy but the SPD film within the laminate still had gained 5.30 transmittance points. Finally, after 227 days of exposure, the SPD film within the laminate no longer functioned when the voltage was applied. It is believed that the moisture present inside the laminate for 15 days eventually caused a malfunction, such as a short-circuit, which rendered the SPD sample inoperable and had we been able to measure the visible transmittance of the SPD film there would have been a significant loss of transmittance points.

In the case of the acrylic and glass hybrid laminate made with the following configuration: Acrylite®/Gorilla® Glass 0.55/SPD/Gorilla® Glass 0.55/Acrylite®, the laminate had been in the 60° C. high humidity chamber for 55 days and no color change was observed for the moisture strip, but the clear interlayer in the laminate became hazy and the SPD film within the laminate lost 2.82 transmittance points. Since this laminate has Acrylite® plastic as the outermost substrates, moisture was able to penetrate through the Acrylite® and cause the clear interlayer between the Acrylite® and the Gorilla® Glass to become cloudy, which is believed to be responsible for the measured loss of transmission for the SPD film. However, the Gorilla® Glass prevented the moisture from penetrating any further into the laminate where the SPD film is positioned. After 306 days of exposure still no color change was observed for the moisture strip, the clear interlayer in the laminate remained hazy and the SPD film within the laminate now lost 8.70 transmittance points. Finally, after 392 days of exposure, color change was observed for the moisture strip and the SPD film within the laminate no longer functioned when the voltage was applied presumably due to a short-circuit. For applications where an SPD laminate with an impact and scratch resistant outer surface is desired this configuration is preferred.

Finally, for an Acrylite®/SPD/Acrylite® laminate, after just 6 days of exposure in the 60° C. high humidity chamber, color change was observed for the moisture strip, the clear interlayer in the laminate became hazy and after 27 days of exposure the SPD film within the laminate had lost 6.50 transmittance points. This confirms that SPD laminates made with only plastic substrates quickly allow moisture to pass through the face of substrates and adversely affect the appearance and performance of the SPD laminate. These results show that SPD laminates made with a combination of thin glass and plastic laminates protect the SPD film from degradation due to moisture exposure while, at the same time, providing, light weight, strength, impact resistance and UV protection.

What is claimed is:

1. A laminated light valve film forming a light-modulating element of a light valve, said laminated film comprising:
   a) a light valve film having first and second opposed outer surfaces, said light valve film comprising
      (i) a cured suspended particle device emulsion having a plurality of uncrosslinked droplets of a liquid light valve suspension distributed throughout the cured emulsion; and
      (ii) first and second plastic sheets, said sheets located outwardly from and sandwiching said cured emulsion wherein, located upon an inner surface of each said first and said second plastic sheet, adjacent said cured emulsion, is a layer of a thin, transparent, electrically conductive coating, said coatings serving as an electrode to permit passage of an applied electric field through said cured emulsion;
   b) a first layer of a polymeric interlayer material applied to at least a portion of each said first and said second opposed outer surface of said light valve film;
   c) a first pair of substrates, wherein one of said first pair is applied upon and adhered to the interlayer material applied upon said first outer opposed surface of said light valve film and a second one of said first pair is applied upon and adhered to the interlayer material applied upon said second outer opposed surface of the light valve film, said first pair of substrates being formed from glass, each of said first pair of substrates having a thickness ranging from 0.55 to 2.0 mm;
   d) a second layer of polymeric interlayer material applied to at least a portion of an outer surface of each one of said first pair of substrates; and
   e) a second pair of substrates, wherein one of said second pair is applied upon and adhered to the interlayer applied upon the outer surface of one of said first pair of substrates and a second one of said second pair is applied upon and adhered to the interlayer material applied upon the outer surface of a second one of said first pair of substrates, said second pair of substrates being formed from plastic, each of said second pair of substrates having a thickness ranging from 1 to 4 mm.

2. The laminated light valve film according to claim 1, wherein the light valve film further comprises a conductive material affixed to the electrodes such that the material extends beyond the perimeter of the laminated light valve film to permit connection of said film to a suitable voltage source.

3. The laminated light valve film according to claim 1, wherein the first pair of substrates is formed of glass and the second pair of substrates is formed of plastic.

4. The laminated light valve film according to claim 1, wherein the first pair of substrates is formed of plastic and the second pair of substrates is formed of glass.

5. The laminated light valve film according to claim 1, wherein the glass used in forming said substrates is selected from the group consisting of tempered glass, annealed glass, low e glass, UV blocking glass, chemically strengthened glass and antimicrobial glass.

6. The laminated light valve film according to claim 1, wherein the thickness of each glass substrate ranges from 0.55 mm to 2.0 mm.

7. The laminated light valve film according to claim 6, wherein the thickness of each glass substrate ranges from 0.55 mm to 1.10 mm.

8. The laminated light valve film according to claim 1, wherein the plastic used in forming said substrates is selected from the group consisting of polycarbonate, polymethyl methacrylate, polystyrene and polypropylene.

9. The laminated light valve film according to claim 1, wherein the thickness of each plastic substrate ranges from 1.0 mm to 10.0 mm.

10. The laminated light valve film according to claim 9, wherein the thickness of each plastic substrate ranges from 1.0 mm to 5.0 mm.

11. The laminated light valve film according to claim 1, wherein the material used in forming the plastic substrates has a softening point at least 10° C. higher than that of the polymeric interlayer material.

12. The laminated light valve film according to claim 11, wherein the polymeric interlayer material is selected from the group consisting of ethylene vinylacetate (EVA) and polyurethane.

* * * * *